US010079626B1

(12) United States Patent
Olgaard et al.

(10) Patent No.: US 10,079,626 B1
(45) Date of Patent: Sep. 18, 2018

(54) METHOD FOR ENABLING CONFIRMATION OF EXPECTED PHASE SHIFTS OF RADIO FREQUENCY SIGNALS EMITTED FROM AN ANTENNA ARRAY

(71) Applicant: LitePoint Corporation, Sunnyvale, CA (US)

(72) Inventors: Christian Volf Olgaard, Saratoga, CA (US); Zhiyong Huang, Fremont, CA (US)

(73) Assignee: LitePoint Corporation, Sunnyvale, CA (US)

( * ) Notice: Subject to any disclaimer, the term of this patent is extended or adjusted under 35 U.S.C. 154(b) by 0 days.

(21) Appl. No.: 15/585,831

(22) Filed: May 3, 2017

(51) Int. Cl.
| | |
|---|---|
| H04B 7/04 | (2017.01) |
| H04B 7/06 | (2006.01) |
| H04B 17/00 | (2015.01) |
| H04B 17/24 | (2015.01) |
| H04B 7/0417 | (2017.01) |
| H04B 7/0452 | (2017.01) |
| H04B 7/0456 | (2017.01) |

(52) U.S. Cl.
CPC .......... H04B 7/0421 (2013.01); H04B 7/046 (2013.01); H04B 7/0452 (2013.01); H04B 7/0634 (2013.01); H04B 17/0085 (2013.01); H04B 17/24 (2015.01)

(58) Field of Classification Search
CPC ...... H04B 7/04; H04B 7/0404; H04B 7/0408; H04B 7/0413; H04B 7/0417; H04B 7/0421; H04B 7/0452; H04B 7/046; H04B 7/0634; H04B 7/0636; H04B 7/0645; H04B 7/065; H04B 7/0654; H04B 7/0656; H04B 17/00; H04B 17/0085; H04B 17/15; H04B 17/16; H04B 17/24; H04B 17/29; H04B 17/336; H04B 17/345

USPC ........ 375/224–227, 260, 267; 370/332–335, 370/342; 455/67.11, 67.13, 67.14, 69
See application file for complete search history.

(56) References Cited

U.S. PATENT DOCUMENTS

| | | | |
|---|---|---|---|
| 2012/0269288 A1 | 10/2012 | Olgaard et al. | |
| 2015/0092824 A1 | 4/2015 | Wicker, Jr. et al. | |
| 2016/0233932 A1* | 8/2016 | Hedayat ............... | H04B 7/0421 |
| 2016/0254884 A1* | 9/2016 | Hedayat ............... | H04B 7/0413 370/329 |
| 2016/0373196 A1 | 12/2016 | Stott et al. | |

(Continued)

OTHER PUBLICATIONS

International Search Report and Written Opinion for Application No. PCT/US18/26916, dated Jul. 13, 2018, Applicant, LitePoint Corporation, (13 pages).

*Primary Examiner* — Young T Tse
(74) *Attorney, Agent, or Firm* — McCracken & Gillen LLC (57) ABSTRACT

A method for assessing receiver signal reception performance during wireless beam steering operation of a radio frequency (RF) data packet signal transceiver capable of multiple input, multiple output (MIMO) operation. In response to transmissions of a sounding packet (SP) from a beamforming device ("beamformer"), a receiving device ("beamformee") transmits a response data packet containing matrix data representing a beamforming feedback matrix (BFM) related to signal attenuation by the wireless signal path environment through which the beamformer and beamformee are communicating. Using the matrix data, a statistical variation can be computed which is indicative of signal reception performance of the beamformee.

19 Claims, 6 Drawing Sheets

(56) References Cited

U.S. PATENT DOCUMENTS

| | | |
|---|---|---|
| 2017/0063438 A1 | 3/2017 | Baik et al. |
| 2017/0064568 A1 | 3/2017 | Elsherif et al. |
| 2017/0111092 A1* | 4/2017 | Goyal .................. H04B 7/0452 |
| 2017/0134187 A1* | 5/2017 | Chen .................... H04B 7/0413 |
| 2017/0195026 A1* | 7/2017 | Ghosh .................. H04B 7/0617 |
| 2017/0290045 A1* | 10/2017 | Nair ..................... H04B 7/0452 |
| 2018/0123655 A1* | 5/2018 | Yao ...................... H04B 7/0408 |

* cited by examiner

VHT Compressed Beamforming frame Action field format

| Order | Information |
|---|---|
| 1 | Catergory |
| 2 | VHT Action |
| 3 | VHT MIMO Control |
| 4 | VHT Compressed Beamforming Report |
| 5 | MU Exclusive Beamforming Report |

METHOD FOR ENABLING CONFIRMATION OF EXPECTED PHASE SHIFTS OF RADIO FREQUENCY SIGNALS EMITTED FROM AN ANTENNA ARRAY

BACKGROUND

The present invention relates to testing of radio frequency (RF) signal transmitters designed to perform beamforming, and in particular, to assessing receiver signal reception performance during wireless beam steering operation of a radio frequency (RF) data packet signal transceiver capable of multiple user, multiple input, multiple output (MU-MIMO) operation.

Many of today's electronic devices use wireless signal technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless signal technologies must adhere to various wireless signal technology standard specifications.

When designing such wireless devices, engineers take extra care to ensure that such devices will meet or exceed each of their included wireless signal technology prescribed standard-based specifications. Furthermore, when these devices are later being manufactured in quantity, they are tested to ensure that manufacturing defects will not cause improper operation, including their adherence to the included wireless signal technology standard-based specifications.

Testing of such wireless devices typically involves testing of the receiving and transmitting subsystems of the device under test (DUT). The testing system will send a prescribed sequence of test data packet signals to a DUT, e.g., using different frequencies, power levels, and/or signal modulation techniques to determine if the DUT receiving subsystem is operating properly. Similarly, the DUT will send test data packet signals at a variety of frequencies, power levels, and/or modulation techniques for reception and processing by the testing system to determine if the DUT transmitting subsystem is operating properly.

For testing these devices following their manufacture and assembly, current wireless device test systems typically employ testing systems having various subsystems for providing test signals to each device under test (DUT) and analyzing signals received from each DUT. Some systems (often referred to as "testers") include at least a vector signal generator (VSG) for providing the source signals to be transmitted to the DUT, and a vector signal analyzer (VSA) for analyzing signals produced by the DUT. The production of test signals by the VSG and signal analysis performed by the VSA are generally programmable (e.g., through use of an internal programmable controller or an external programmable controller such as a personal computer) so as to allow each to be used for testing a variety of devices for adherence to a variety of wireless signal technology standards with differing frequency ranges, bandwidths and signal modulation characteristics.

Wireless devices, such as cellphones, smartphones, tablets, etc., make use of standards-based technologies, such as IEEE 802.11a/b/g/n/ac/ad/ax/ay ("Wi-Fi"), 3GPP LTE, and Bluetooth. The standards that underlie these technologies are designed to provide reliable wireless connectivity and/or communications. The standards prescribe physical and higher-level specifications generally designed to be energy-efficient and to minimize interference among devices using the same or other technologies that are adjacent to or share the wireless spectrum.

Tests prescribed by these standards are meant to ensure that such devices are designed to conform to the standard-prescribed specifications, and that manufactured devices continue to conform to those prescribed specifications. Most devices are transceivers, containing at least one or more receivers and transmitters. Thus, the tests are intended to confirm whether the receivers and transmitters both conform. Tests of the receiver or receivers (RX tests) of a DUT typically involve a test system (tester) sending test packets to the receiver(s) and some way of determining how the DUT receiver(s) respond to those test packets. Transmitters of a DUT are tested by having them send packets to the test system, which then evaluates the physical characteristics of the signals sent by the DUT.

Figure 1A:
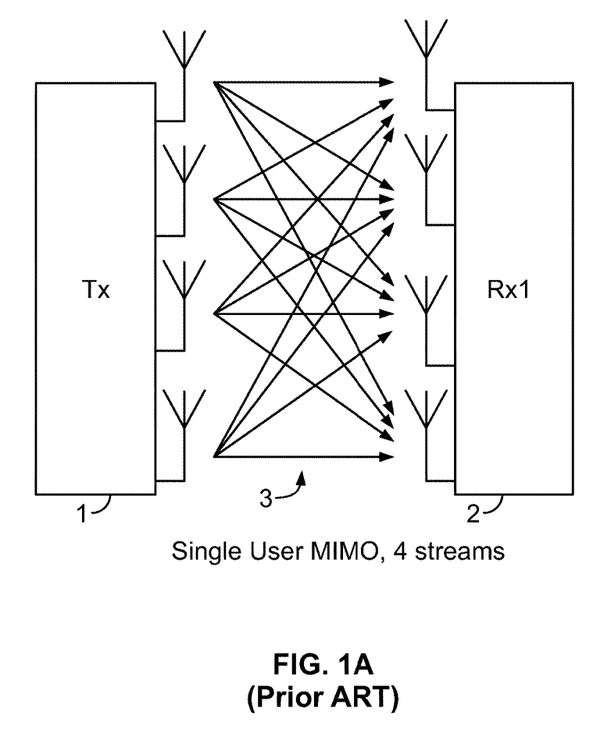
FIGS. 1A and 1B depict conventional over the air (OTA) test environments for SU-MIMO and MU-MIMO operations.
Figure 1B:
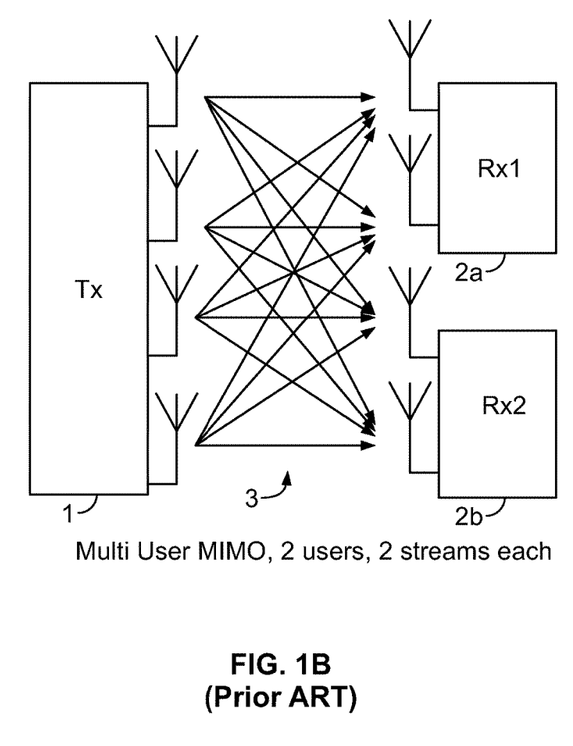

Referring to FIGS. 1A and 1B, more recent versions of the IEEE 802.11 standards provide for beam steering, or beamforming, to enable transmission and reception of more spatially directional signal streams having higher effective signal-to-noise ratios (SNRs) and higher data rates. Also enabled are communications with and/or between devices having multiple inputs and/or multiple output signal streams in either single user (SU) mode (FIG. 1A), in which the multiple signal streams 3 of the source ("beamformer") 1 are steered to all input ports of a client ("beamformee") 2, or multiple user (MU) mode (FIG. 1B), in which subsets 3a, 3b of the signal streams of the source 1 are steered to the input ports of respective clients 2a, 2b.

More particularly, the IEEE 802.11ac standard provides specifications for multiple user, multiple input, multiple output (MU-MIMO) operations. The "MIMO" capability is the use of multiple antennas at the receiver (multiple input or "MI . . . ") and the transmitter (multiple input or "MO . . . ") to improve communication performance through advanced digital signal processing. It takes advantage of the separate transmit/receive chains associated with each antenna improve the link robustness and/or increase the data rate. This enables wireless communications having higher signal bandwidths to enable higher data throughputs. The "MU" capability allows multiple devices to communicate separately, e.g., using a single access point (AP). In other words, as opposed to single-user MIMO (SU-MIMO) operation where two devices communicate only with each other via all available antennas, MU-MIMO allows a terminal to transmit and receive signals to and from multiple users in the same frequency band simultaneously.

Figure 2:
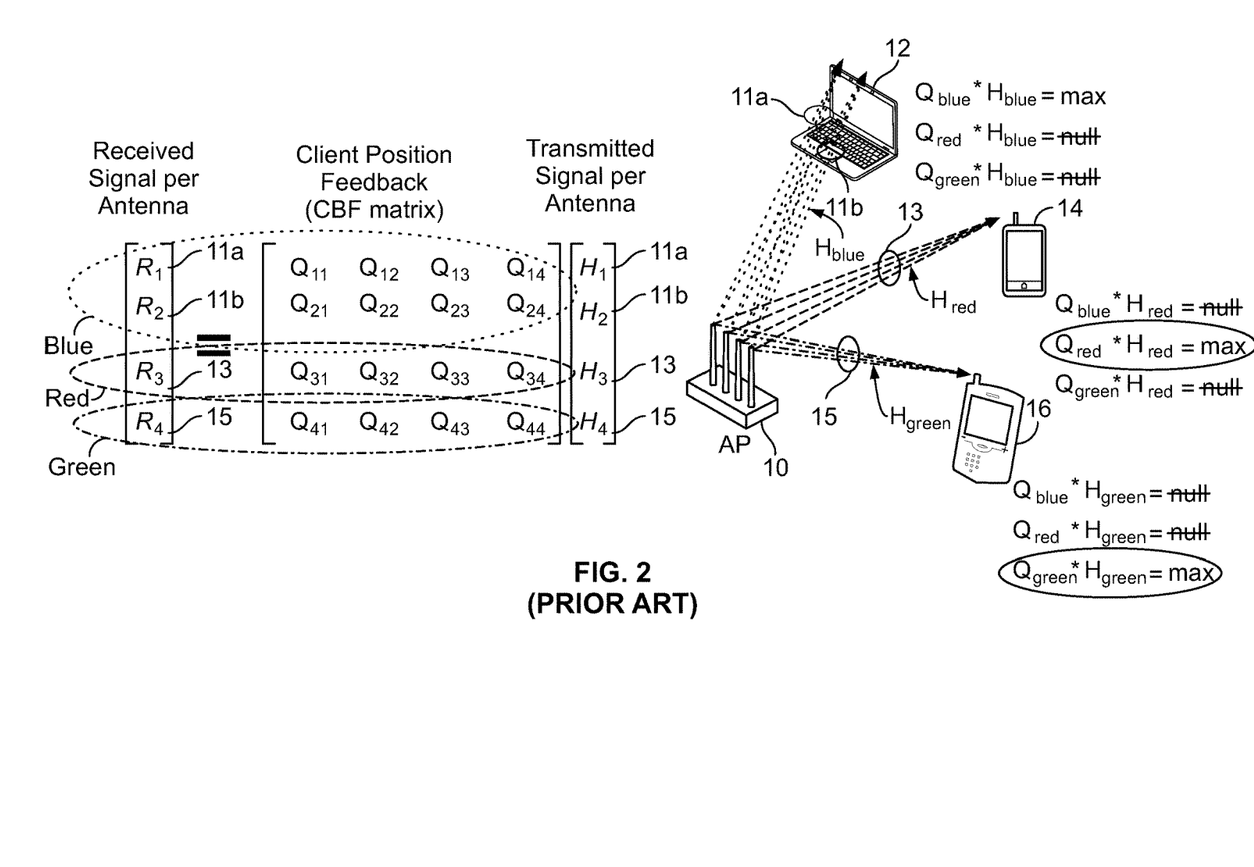
FIG. 2 depicts a conventional use of a BFM matrix during MU-MIMO operations between a source and multiple users.

Referring to FIG. 2, during MU-MIMO operation between a source 10 (e.g., an AP with four antennas) and multiple clients 12 (e.g., a laptop computer with dual antennas), 14 (a smartphone with a single antenna), 16 (a cellular telephone with a single antenna), a steering matrix is used to inform the source 10 about received signals. The station (client) provides beamforming feedback by generating and providing a beamforming feedback matrix (BFM), e.g., by using the received signal header to generate a compressed beamforming feedback (CBF) matrix in response to a sounding packet (SP), which in this example could be a Null Data Packet (NDP) packet. The CBF matrix (V-matrix) is then transmitted back to the source as part of the response packet generated as a response to the NDP packet.

Accuracy of the CBF matrix plays a significant role in determining how effective the MU-MIMO steering operations are. To get the best possible beamforming feedback matrix accuracy, one needs a very clean input signal to the client receiver, and any noise and/or distortion added to the signal by the receiver must be minimized. Quality of signal emissions by the client transmitter may be fairly simple to measure using a good VSA (e.g., so long as a common local oscillator is used to maintain reference signal phase coherency), but added effects on signal quality by client receiver contributions are more complex to determine. One solution would be to measure the receive error vector magnitude (EVM). However, access to digitized IQ data samples is typically not possible in many testing environments, especially during manufacturing tests.

Figure 3:
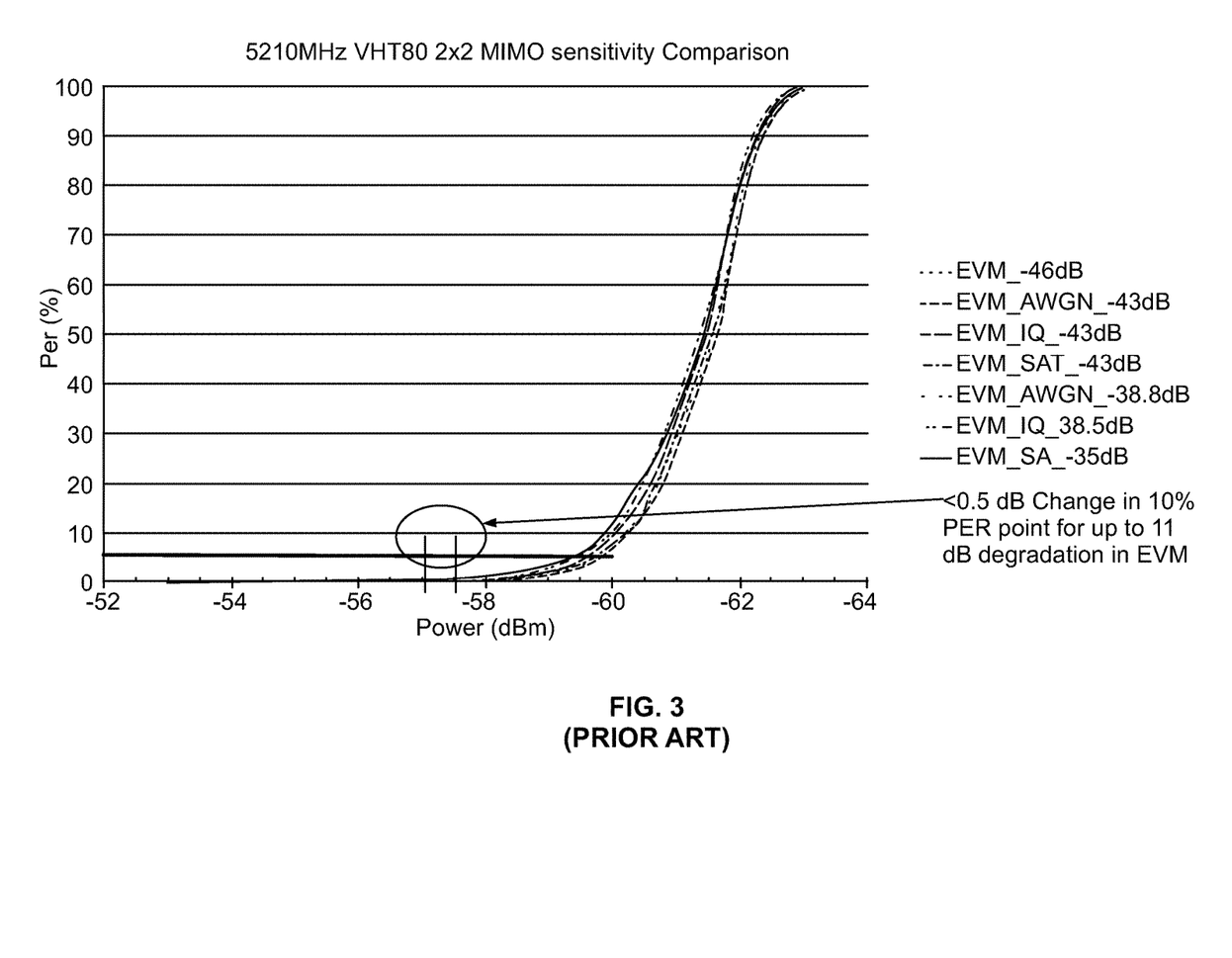
FIG. 3 depicts an exemplary comparison of sensitivity of a 2×2 MIMO VHT device operating at 5210 MHz with a 80 MHz bandwidth.

Referring to FIG. 3, alternatively, receive quality is often measured using packet error (PER) testing. However, once the receiver reaches a certain EVM level, further improvement in the EVM has minimal effect on the PER. Therefore, even testing for sensitivity of the receiver will not reveal the true receiver EVM (even using a high quality VSG), since accuracy and statistical variations of the output power of a VSG are worse than variations in PER due to degraded EVM. Hence, traditional PER cannot be effectively used to test for receiver quality of the receiver, but only for whether it is sufficient to pass a PER requirement. For example, IEEE standards specify an EVM of −35 dB for transmit signal (TX) quality, but it is believed that −41 dB is optimal for MU-MIMO. Thus, a receive signal (RX) EVM of −35 dB will yield essentially the same PER as a RX EVM of −41 dB (with less than 0.5 dB variation). Accordingly, a better way to test the quality of a MU-MIMO beamforming receiver is needed.

SUMMARY

A method for assessing receiver signal reception performance during wireless beam steering operation of a radio frequency (RF) data packet signal transceiver capable of multiple input, multiple output (MIMO) operation. In response to transmissions of a sounding packet (SP) from a beamforming device ("beamformer"), a receiving device ("beamformee") transmits a response data packet containing matrix data representing a beamforming feedback matrix (BFM) related to signal attenuation by the wireless signal path environment through which the beamformer and beamformee are communicating. Using the matrix data, a statistical variation can be computed which is indicative of signal reception performance of the beamformee.

In accordance with an exemplary embodiment of the presently claimed invention, a method for assessing receiver signal reception performance during wireless beam steering operation of a device under test (DUT), including a radio frequency (RF) data packet signal transceiver capable of multiple input, multiple output (MIMO) operation, includes:

transmitting a MIMO sounding packet (SP) via a wireless signal path environment for reception by the DUT;

receiving a response data packet related to the MIMO SP and containing matrix data representing a beamforming feedback matrix (BFM) related to signal attenuation by the wireless signal path environment;

processing the matrix data to produce processed data;

repeating the transmitting, receiving and processing to produce a plurality of processed data; and computing, based on the plurality of processed data, a statistical variation among corresponding portions of the plurality of processed data.

In accordance with another exemplary embodiment of the presently claimed invention, a method for assessing receiver signal reception performance during wireless beam steering operation of a device under test (DUT), including a radio frequency (RF) data packet signal transceiver capable of multiple input, multiple output (MIMO) operation, includes:

transmitting a plurality of MIMO sounding packets (SPs) having a plurality of mutually distinct signal phases via a wireless signal path environment for reception by the DUT;

receiving one or more response data packets related to at least a portion of the plurality of MIMO SPs and containing matrix data representing a beamforming feedback matrix (BFM) related to signal attenuation by the wireless signal path environment;

processing the matrix data to produce a plurality of processed data; and computing, based on the plurality of processed data, a statistical variation among corresponding portions of the plurality of processed data.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

In accordance with exemplary embodiments of the presently claimed invention, a beamforming operation is initiated based upon which statistical variations are determined of reported V-matrix data included in packets from a device under test (DUT) generated in response to reception of an NDP packet. By averaging the response over multiple packets with a high quality input signal (e.g., using a VSG) any introduced variations must originate from imperfections in the DUT receiver (e.g., added noise and/or distortion). Since the matrix data is reported in digital form (e.g., data packets), the DUT transmitter does not influence the reported matrix data. Further, even if the DUT receiver is "perfect", minimal variation otherwise is expected due to the data field being limited in number of bits.

The following discussion, for purposes of describing exemplary embodiments of the presently claimed invention, is in context of systems adhering primarily to the IEEE 802.11ac standard. However, as will be readily appreciated by one of ordinary skill in the art, such additional embodiments can be implemented using systems adhering to other standards, including, for example and without limitation, IEEE 802.11ax and 802.11ay as well as cellular telephony systems such as LTE and 5G.

Figure 4:
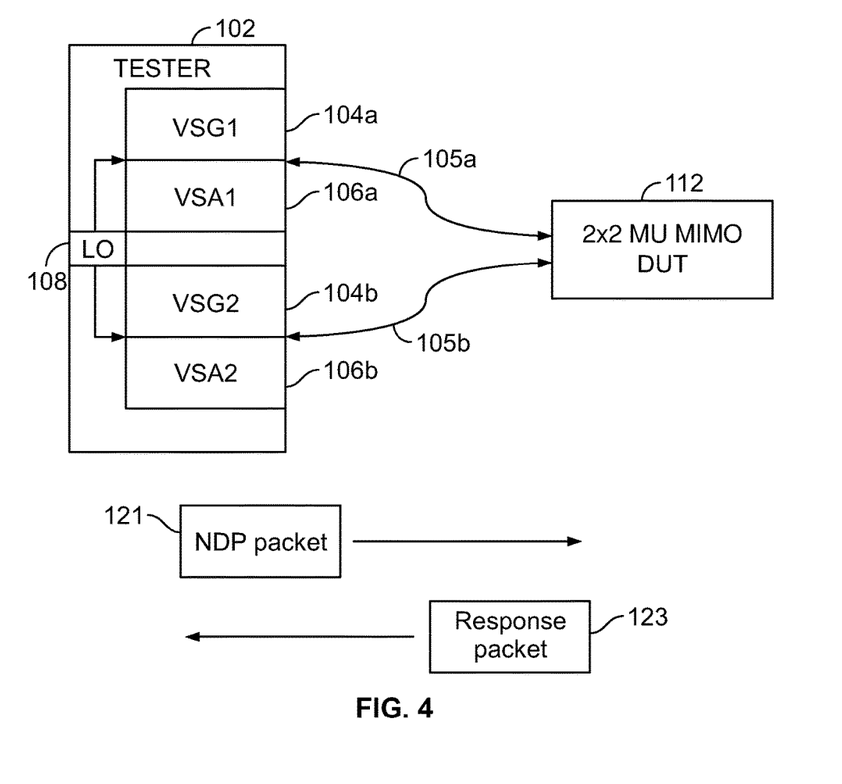
FIG. 4 depicts a testing environment in accordance with exemplary embodiments of the presently claimed invention.

Referring to FIG. 4, in accordance with exemplary embodiments of the presently claimed invention, a tester 102 including a dual VSG 104 (e.g., in a form of two VSGs 104a, 104b synchronized with a common local oscillator 108 to ensure repeated relative phase information between the MIMO signals 105a, 105b) transmitting a MIMO NDP 121 to the DUT 112. This can be done at a high SNR of the DUT receiver or at least close to its sensitivity. The DUT 112 processes the received NDP in accordance with known principles and transmits back a response packet 123.

Figure 5:
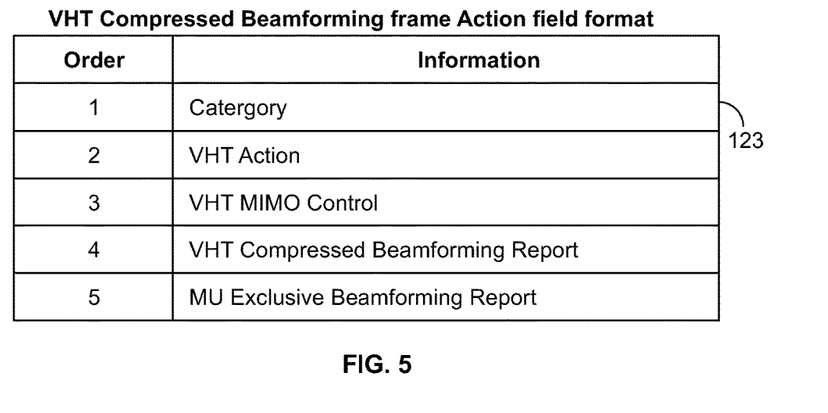
FIG. 5 depicts a typical VHT Compressed Beamforming Frame action field format.

Referring to FIG. 5, the CBF matrix data is included in the fourth field of the VHT (very high throughput) Beamforming Report (discussed further below) sent as the response packet 123. The response packet 123 is captured by a VSA (e.g., two VSAs 106a, 106b to enable full MIMO operation by the tester 102) and the CBF matrix data are extracted from the packet 123 and processed. (This processing may include, for example and without limitation, any one or more of decoding of the data, processing the decoded binary information and recreating the transmitter steering matrix.) By repeating this multiple times, statistical variations of the extracted CBF matrices data can be determined and an evaluation can be made.

To determine suitable evaluation criteria, one option can be use of a known good device (KGD) initially in place of the DUT 112 (FIG. 4). Exposing the receiver of the KGD to VSG signals with reduced but repeatable EVM (e.g., reduced SNR, phase noise and distortion) resultant CBF matrix data variations can be determined, and a variation to EVM correlation can be determined for use in deriving suitable pass/fail criteria. Alternatively, desired performance and degradation can be simulated by introducing appropriate signal phase angle variations.

Figure 6:
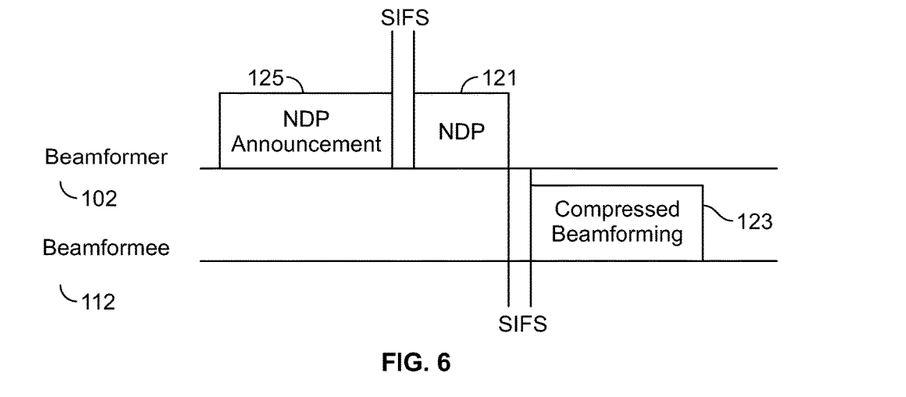
FIG. 6 depicts a channel calibration procedure for assessing receiver signal reception performance during wireless beam steering operation in accordance with exemplary embodiments of the presently claimed invention.

Referring to FIG. 6, assessing receiver signal reception performance during wireless beam steering operation in accordance with exemplary embodiments of the presently claimed invention uses a single user beamforming channel calibration procedure to shape a transmission from a single transmitter to a single receiver. The beamformer 102 sends a NDP 121, which is a frame with a known fixed format. The beamformee 112 analyzes the received NDP 121 and calculates a feedback matrix that is sent in the reply packet 123 (following a short interframe spacing SIFS). This channel calibration procedure is a single through which the beamformer 102 and beamformee 112 cooperatively determine the signal transmission channel characteristics to provide the raw data needed to calculate a steering matrix. The beamformee 112 does not provide a steering matrix directly, but instead works to provide information necessary for the beamformer 102 to calculate its steering matrix.

Figure 7:
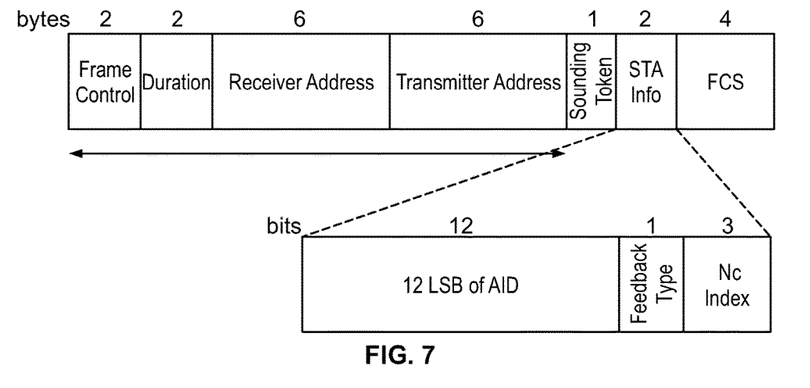
FIG. 7 depicts a NDP Announcement frame format for SU-MIMO operation.

Referring to FIG. 7, this channel calibration procedure is part of a channel sounding process that begins when the beamformer transmits a NDP Announcement frame, which is a control frame. The entire channel sounding process is carried out in one burst, so the duration set in an NDP Announcement corresponds to the length of the full exchange of three frames. In SU-MIMO beamforming, the NDP Announcement frame relays the size of the CBF feedback matrix by identifying the number of columns in the feedback matrix. The main purpose of the NDP Announcement frame is to carry a single Station ("STA") Info field for the intended beamformee. The STA Info field is two bytes long and consists of three fields.

The Association ID ("AID") field contains the 12 least significant bits of the association ID assigned to the intended beamformee upon its association to an 802.11 AP. If the client device acts as a beamformer, this field is set to 0 because the AP does not have an association ID.

The Feedback Type field is a zero in a single-user NDP Announcement frame.

The Nc Index field identifies the number of columns in the feedback matrix, with one column for each spatial stream. This three-bit field can take on eight values, which matches the eight streams supported by 802.11ac. This field is set to the number of spatial streams minus one.

Figure 8:
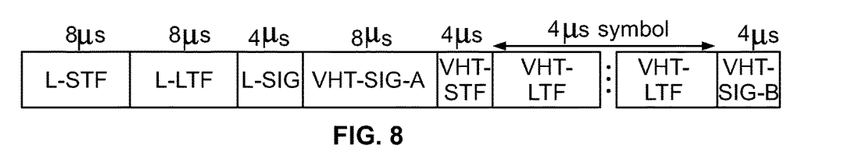
FIG. 8 depicts a NDP format.

Referring to FIG. 8, following transmission of the NDP Announcement frame, the beamformer transmits the NDP frame. The name "null data packet" is based on a Physical Layer Convergence Protocol ("PLCP") frame with no data field, so there is no 802.11 MAC frame. Channel sounding can be done by analyzing the received training symbols in the PLCP header, thereby avoiding need for MAC data. Within a NDP there is one VHT Long Training Field (VHT-LTF) for each spatial stream used in data transmission.

Figure 9:
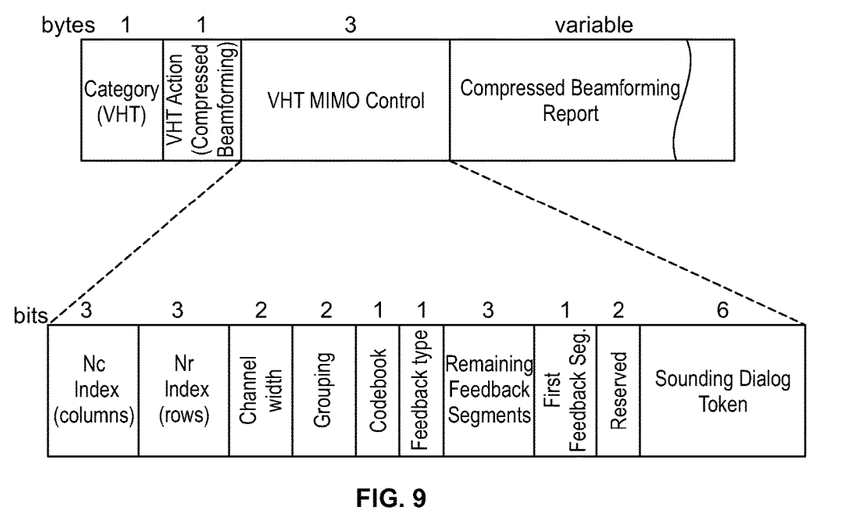
FIG. 9 depicts a Compressed Beamforming Action frame for SU-MIMO operation.

Referring to FIG. 9, the VHT Compressed Beamforming Action frame is responsive to reception of the NDP, and contains a feedback matrix. The feedback matrix informs the beamformer how the NDP training symbols were received and how the beamformer should steer frames to the beamformee. The Action frame header indicates that the frame contains a feedback matrix. Next is a VHT MIMO Control field, which enables the beamformer to interpret the feedback matrix by describing six attributes.

(1) Size of the feedback matrix (6 bits): The Nc Index and Nr Index fields identify the numbers of columns and rows, respectively, of the feedback matrix. As the number of spatial streams increase in a beamformed transmission, the resulting matrix becomes larger.

(2) Channel width (2 bits): The size of the feedback matrix also depends on the size of the underlying channel. A wider channel requires a larger feedback matrix to account for more individual signal carriers to measure.

(3) Grouping (2 bits): If parts of the beamforming matrix are repeated, the beamformee can group multiple spatial streams together to reduce the size of the transmitted matrix.

(4) Codebook (1 bit): A beamforming matrix is effectively used to describe phase shifts required by the antenna elements. According to the IEEE 802.11ac standard, the beamformer transmits information with the described phase shifts as a long string of bits. The receiver of a steering matrix needs to know where to split the bit field into individual matrix elements, and this field describes the representation of such data.

(5) Type of feedback (1 bit): In SU-MIMO, the feedback type will be single user.

(6) Flow control (10 bits): The Remaining Feedback Segments, First Feedback Segment and Sounding Dialog Token fields together enable the response from the beamformee to be matched with the request by the beamformer. In large matrices associated with wide bandwidths and high numbers of spatial streams, the matrix will be large and, therefore, may need to be sent to the beamformer in multiple segments.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method for assessing receiver signal reception performance during wireless beam steering operation of a device under test (DUT), including a radio frequency (RF) data packet signal transceiver capable of multiple input, multiple output (MIMO) operation, the method comprising:
    transmitting a MIMO sounding packet (SP) via a wireless signal path environment for reception by said DUT;
    receiving a response data packet related to said MIMO SP and containing matrix data representing a compressed beamforming feedback (CBF) matrix V related to signal attenuation by said wireless signal path environment;
    processing said matrix data to produce processed data;
    repeating said transmitting, receiving and processing to produce a plurality of processed data; and
    computing, based on said plurality of processed data, a statistical variation among corresponding portions of said plurality of processed data.

2. The method of claim 1, wherein said transmitting the MIMO SP comprises transmitting said MIMO SP with a plurality of data packet signal sources.

3. The method of claim 1, wherein said transmitting the MIMO SP via the wireless signal path environment comprises transmitting said MIMO SP with a plurality of signal radiating elements.

4. The method of claim 1, wherein said transmitting the MIMO SP comprises transmitting said MIMO SP via a plurality of data packet signals having a common nominal carrier signal frequency with a common carrier signal phase.

5. The method of claim 1, wherein said transmitting the MIMO SP comprises transmitting said MIMO SP via a plurality of separately radiated wireless data packet signals having a common nominal carrier signal frequency with a common carrier signal phase.

6. The method of claim 1, wherein said CBF matrix V related to the signal attenuation by said wireless signal path environment comprises a matrix including a plurality of elements related to phases of said transmitted MIMO SP.

7. The method of claim 1, wherein said CBF matrix V related to the signal attenuation by said wireless signal path environment comprises a normalized matrix.

8. The method of claim 1, wherein said processing said matrix data to produce the processed data comprises processing a plurality of binary elements of said matrix data to produce a corresponding plurality of decimal elements.

9. The method of claim 1, wherein said repeating said transmitting, receiving and processing comprises alternating said repeating of said transmitting, receiving and processing.

10. The method of claim 1, wherein:
    said plurality of processed data comprises a plurality of matrices having respective pluralities of matrix elements; and
    said computing, based on said plurality of processed data, the statistical variation among corresponding portions of said plurality of processed data comprises computing a plurality of variations among corresponding ones of said respective pluralities of matrix elements.

11. A method for assessing receiver signal reception performance during wireless beam steering operation of a device under test (DUT), including a radio frequency (RF) data packet signal transceiver capable of multiple input, multiple output (MIMO) operation, the method comprising:
    transmitting a plurality of MIMO sounding packets (SPs) having a plurality of mutually distinct signal phases via a wireless signal path environment for reception by said DUT;
    receiving one or more response data packets related to at least a portion of said plurality of MIMO SPs and containing matrix data representing a compressed beamforming feedback (CBF) matrix V related to signal attenuation by said wireless signal path environment;
    processing said matrix data to produce a plurality of processed data; and
    computing, based on said plurality of processed data, a statistical variation among corresponding portions of said plurality of processed data.

12. The method of claim 11, wherein said transmitting the plurality of MIMO SPs comprises transmitting said plurality of MIMO SPs with a plurality of data packet signal sources.

13. The method of claim 11, wherein said transmitting the plurality of MIMO SPs via the wireless signal path environment comprises transmitting said plurality of MIMO SPs with a plurality of signal radiating elements.

14. The method of claim 11, wherein said transmitting the plurality of MIMO SPs comprises transmitting said plurality of MIMO SPs via the plurality of data packet signals having a common nominal carrier signal frequency with a common carrier signal phase.

15. The method of claim 11, wherein said transmitting the plurality of MIMO SPs comprises transmitting said plurality of MIMO SPs via a plurality of separately radiated wireless data packet signals having a common nominal carrier signal frequency with a common carrier signal phase.

16. The method of claim 11, wherein said CBF matrix V related to the signal attenuation by said wireless signal path environment comprises a matrix including a plurality of elements related to said plurality of mutually distinct signal phases of said transmitted plurality of MIMO SPs.

17. The method of claim 11, wherein said CBF matrix V related to the signal attenuation by said wireless signal path environment comprises a normalized matrix.

18. The method of claim 11, wherein said processing said matrix data to produce the plurality of processed data comprises processing a plurality of binary elements of said matrix data to produce a corresponding plurality of decimal elements.

19. The method of claim 11, wherein:
said plurality of processed data comprises a plurality of matrices having respective pluralities of matrix elements; and
said computing, based on said plurality of processed data, the statistical variation among corresponding portions of said plurality of processed data comprises computing a plurality of variations among corresponding ones of said respective pluralities of matrix elements.

\* \* \* \* \*